(12) United States Patent
Briglia et al.

(10) Patent No.: US 9,746,233 B2
(45) Date of Patent: Aug. 29, 2017

(54) PROCESS FOR THE SEPARATION OF A GAS RICH IN CARBON DIOXIDE

(71) Applicant: L'Air Liquide, Societe Anonyme pour l'Etude et l'Exploitation des Procedes Georges Claude, Paris (FR)

(72) Inventors: Alain Briglia, Hangzhou (CN); Arthur Darde, Paris (FR); Paul Terrien, Paris (FR)

(73) Assignee: L'Air Liquide Socieété Anonyme Pour l'Étude Et l'Exploitation Des Procedes Georges Clause, Paris (FR)

( * ) Notice: Subject to any disclaimer, the term of this patent is extended or adjusted under 35 U.S.C. 154(b) by 268 days.

(21) Appl. No.: 14/413,883

(22) PCT Filed: Jul. 8, 2013

(86) PCT No.: PCT/EP2013/064346
§ 371 (c)(1),
(2) Date: Jan. 9, 2015

(87) PCT Pub. No.: WO2014/009300
PCT Pub. Date: Jan. 16, 2014

(65) Prior Publication Data
US 2015/0204605 A1    Jul. 23, 2015

(30) Foreign Application Priority Data

Jul. 13, 2012  (EP) ..................................... 12305848

(51) Int. Cl.
*F25J 3/00*    (2006.01)
*F25J 1/00*    (2006.01)
(Continued)

(52) U.S. Cl.
CPC ........... *F25J 1/0027* (2013.01); *F25J 3/0223* (2013.01); *F25J 3/0266* (2013.01); *F25J 3/0295* (2013.01);
(Continued)

(58) Field of Classification Search
CPC ........ F25J 3/067; F25J 3/0266; F25J 2215/80; F25J 2210/80; F25J 2220/80;
(Continued)

(56) References Cited

U.S. PATENT DOCUMENTS

| 5,983,663 | A |   | 11/1999 | Sterner |
| 6,070,431 | A | * | 6/2000 | Howard ................. C01B 31/20 |
|  |  |  |  | 62/620 |

(Continued)

FOREIGN PATENT DOCUMENTS

| EP | 2 023 066 | 2/2009 |
| EP | 2 381 198 | 10/2011 |

(Continued)

OTHER PUBLICATIONS

International Search Report for PCT/EP2013/064346, mailed Nov. 28, 2013.

*Primary Examiner* — Brian King
(74) *Attorney, Agent, or Firm* — Justin K. Murray

(57) ABSTRACT

In a process for the separation of a gas rich in carbon dioxide and containing at least one component lighter than carbon dioxide, the feed gas rich in carbon dioxide is cooled in a first heat exchanger, partially condensed and separated to form a gaseous portion and a liquid, sending the liquid portion to the top of a distillation column, removing a liquid stream richer in carbon dioxide than the feed gas from the bottom of the distillation column, removing a gaseous stream less rich in carbon dioxide than the feed gas from the top of the distillation column and warming the gaseous (Continued)

stream in the first heat exchanger, sending the gaseous portion to a shell and tube heat exchanger having tubes in a bath of triple point carbon dioxide, in which it condenses at least partially to form a liquid fraction, sending the liquid fraction to the top of the distillation column, vaporizing a liquid stream from the bottom of the distillation column outside or within the distillation column to form a gas which is subsequently separated in the distillation column, expanding a liquid stream from the bottom of the distillation column, vaporizing at least part of the expanded liquid stream in the shell and tube heat exchanger to form a vapor and warming the vapor formed in the first heat exchanger.

11 Claims, 2 Drawing Sheets

(51) Int. Cl.
*F25J 5/00* (2006.01)
*F25J 3/02* (2006.01)

(52) U.S. Cl.
CPC ............ *F25J 5/005* (2013.01); *F25J 2200/02* (2013.01); *F25J 2200/70* (2013.01); *F25J 2205/04* (2013.01); *F25J 2210/04* (2013.01); *F25J 2215/04* (2013.01); *F25J 2220/82* (2013.01); *F25J 2230/30* (2013.01); *F25J 2245/02* (2013.01); *F25J 2250/02* (2013.01); *F25J 2270/02* (2013.01); *F25J 2280/02* (2013.01); *F25J 2280/40* (2013.01); *F25J 2290/12* (2013.01); *F25J 2290/34* (2013.01); *Y02C 10/12* (2013.01)

(58) Field of Classification Search
CPC .. F25J 2220/84; F25J 2260/80; F25J 2220/66; F25J 2220/82; B01D 53/002; Y02C 10/12
See application file for complete search history.

(56) References Cited

U.S. PATENT DOCUMENTS

| 7,819,951 | B2* | 10/2010 | White | C01B 31/20 210/180 |
|---|---|---|---|---|
| 2007/0231244 | A1* | 10/2007 | Shah | C01B 31/20 423/437.1 |
| 2008/0196587 | A1* | 8/2008 | Ha | F25J 3/0266 95/204 |
| 2009/0013868 | A1* | 1/2009 | Darde | B01D 53/002 95/42 |

FOREIGN PATENT DOCUMENTS

| FR | 2 967 485 | 5/2012 |
|---|---|---|
| WO | WO 2009 007 938 | 1/2009 |
| WO | WO 2011 089 382 | 7/2011 |

* cited by examiner

PROCESS FOR THE SEPARATION OF A GAS RICH IN CARBON DIOXIDE

CROSS REFERENCE TO RELATED APPLICATIONS

This application is a §371 of International PCT Application PCT/EP2013/064346, filed Jul. 8, 2013, which claims the benefit of EP12305848.9, filed Jul. 13, 2012, both of which are herein incorporated by reference in their entireties.

TECHNICAL FIELD OF THE INVENTION

The present invention relates to a process for the separation of a gas rich in carbon dioxide.

BACKGROUND

A gas rich in carbon dioxide contains at least 65% carbon dioxide. It also contains at least one other component chosen from the following list: oxygen, nitrogen, argon, carbon monoxide, hydrogen, nitrogen monoxide, nitrogen dioxide, nitrous oxide, mercury, methanol, ethanol, ammonia or hydrocarbons.

Preferably it contains less than 5% methane, all percentages in this document relating to purities being molar percentages.

The gas rich in carbon dioxide may result from an oxy-fuel combustion, a cement works, a steel works, a steam methane reformer or any other known source.

The present invention proposes, amongst other possibilities, to carry out the final cooling stage of a carbon dioxide purification unit feed gas in a shell-tube exchanger.

The feed gas is cooled in the tubes which are surrounded by a bath of carbon dioxide at its triple point.

There are many advantages associated with operating the system at its triple point.

Firstly the pressure of the shell is perfectly stable at the triple point. If the compressor which compresses the vaporised carbon dioxide coming from the shell tube exchanger removes too much gas, the liquid will flash, forming solid and gas, the whole resting at the triple point pressure. On the other hand, if too little gas is removed, the pressure cannot increase to a substantial extent, due to the presence of frozen carbon dioxide. When the solid phase is in the form of micro-crystals mixed in with the liquid, a liquid-solid "slush" is formed, which increases the solid-liquid exchange surface, as compared with the situation when large blocks of frozen carbon dioxide are formed in the liquid.

Secondly, the feed gas will be cooled as much as possible, to increase the yield of produced carbon dioxide and thereby improve the specific energy and specific cost of the plant (the additional expense to capture the additional tones of carbon dioxide is less than the average expense per tonne).

Thirdly, the feed gas cannot freeze since the cold source is stabilized at the triple point temperature and the feed gas will necessary be above that temperature.

The arrangement allows the solid carbon dioxide to be stored and melted, meaning that the energy can be stored and/or the liquefaction capacity increased.

In the case where energy is stored, when energy prices are low, an additional compressor (or the product compressor) removes more gaseous carbon dioxide than would naturally be vaporized, to create a suction effect. The liquid in the storage then flashed forming gas (to stabilize the pressure at the triple point) and solid, which mixes with the remaining liquid.

When energy prices increase, the liquid carbon dioxide is melted by sending additional gaseous carbon dioxide into the storage; the solid carbon dioxide melts by liquefying the gaseous carbon dioxide, the additional liquid formed is pumped outside the cold box and the carbon dioxide can be produced at the production pressure, without using the product compressor.

The product compressor is designed to take advantage of these flow variations, the flowrate for a centrifugal compressor being down to 80% of the nominal flowrate. One solution to the problem could be to use three smaller compressors, representing each 50% of the nominal flowrate. In this case, under normal operation, two compressors would operate. During the storage of solid $CO_2$ phase (when energy costs are low), three compressors would operate and during the high energy cost period, one compressor and a pump would operate In this case, the pump is required to pressurize the liquid coming out of the shell and tube heat exchanger prior to mixing it with the remainder of the $CO_2$ product (either liquid or supercritical).

Under normal operation, the solid carbon dioxide formed and builds up in the storage. At peak production, more carbon dioxide is available to be liquefied, it is sent in gaseous form to the storage where it liquefies against the solid carbon dioxide, which melts, thus increasing the maximum liquefying capacity, without increasing the dimensions of the apparatus.

SUMMARY OF THE INVENTION

According to an object of the invention, there is provided a process for the separation of a gas rich in carbon dioxide and containing at least one component lighter than carbon dioxide in which the feed gas rich in carbon dioxide is cooled to a subambient temperature in a first heat exchanger, partially condensed and separated to form a gaseous portion and a liquid, sending the liquid portion to the top of a distillation column, removing a liquid stream richer in carbon dioxide than the feed gas from the bottom of the distillation column, removing a gaseous stream less rich in carbon dioxide than the feed gas from the top of the distillation column and warming the gaseous stream in the first heat exchanger, sending the gaseous portion to a heat exchanger in which it condenses at least partially to form a liquid fraction, sending the liquid fraction or a liquid derived therefrom to the top of the distillation column, vaporizing a liquid stream from the bottom of the distillation column outside or within the distillation column to form a gas which is subsequently separated in the distillation column, removing a liquid stream from the bottom of the distillation column, vaporizing at least part of the removed liquid stream in the shell and tube heat exchanger to form a vapor and warming the vapor formed in the first heat exchanger characterized in that the liquid portion is sent to the top of the distillation column following an expansion step, the liquid stream from the bottom of the distillation column is expanded before vaporization, the heat exchanger to which the gaseous portion is sent is a shell and tube heat exchanger, the tubes of which are surrounded by a bath of carbon dioxide at its triple point, and in which the removed liquid stream is vaporized.

According to further optional aspects:

the shell and tube heat exchanger operates at the triple point pressure of carbon dioxide and the triple point temperature of carbon dioxide.

the vapor formed in the shell and tube heat exchanger and warmed in the first heat exchanger is compressed in at least one compressor.

the gaseous portion is at least partially condensed in the tubes of the shell and tube heat exchanger and the liquid stream is at least partially vaporized within the shell and tube heat exchanger, outside the tubes.

in the case of operation with a given carbon dioxide production, solid carbon dioxide is formed in the shell and tube heat exchanger, in the case of increased production of carbon dioxide, the flowrate of the gaseous portion sent to the shell and tube heat exchanger increases and the solid carbon dioxide in the shell and tube heat exchanger melts and the flowrate of the liquid fraction removed from the shell and tube heat exchanger increases.

in the case of operation with a given carbon dioxide production, solid carbon dioxide is formed in the shell and tube heat exchanger and in the case of reduced production of carbon dioxide, the amount of solid carbon dioxide formed in the shell and tube heat exchanger increases.

liquid carbon dioxide is withdrawn from the column as a final product.

two streams of liquid carbon dioxide from the bottom of the column are expanded and sent to the shell and tube heat exchanger.

partially condensed feed from the shell and tube exchanger is separated and the liquid stream formed is expanded and sent to the top of the distillation column.

part of the liquid outside the tubes is purged in order to de-concentrate the liquid in at least one impurity.

the at least one impurity is chosen from SOx, NOx, mercury, hydrocarbons, methanol, ethanol, ammonia.

the first heat exchanger is a plate-fin heat exchanger.

The process may be perfomed in an apparatus for the separation of a gas rich in carbon dioxide and containing at least one component lighter than carbon dioxide comprising a first heat exchanger for cooling the feed gas rich in carbon dioxide to a subambient temperature, a shell and tube heat exchanger, a first phase separator, a column, a conduit for sending partially condensed feed from the first heat exchanger to the first phase separator, a conduit for sending a liquid portion from the first phase separator to the top of a distillation column via an expansion valve, a conduit for removing a liquid stream richer in carbon dioxide than the feed gas from the bottom of the distillation column, a conduit for removing a gaseous stream less rich in carbon dioxide than the feed gas from the top of the distillation column and for sending the gaseous stream to be warmed in the first heat exchanger, a conduit connecting the first phase separator to the shell and tube heat exchanger, a conduit for sending a liquid fraction from the shell and tube heat exchanger or a liquid derived therefrom to the top of the distillation column, a conduit for sending a liquid stream from the bottom of the distillation column to be vaporized outside or within the distillation column to form a gas which is subsequently separated in the distillation column, an expansion valve expanding a liquid stream from the bottom of the distillation column, a conduit for sending the expanded liquid stream to the shell and tube heat exchanger to be at least partially vaporized to form a vapor and a conduit for sending the vapor formed to the first heat exchanger.

The apparatus may comprise a compressor for compressing the vapor formed in the shell and tube heat exchanger.

There are means for sending the gaseous portion to be at least partially condensed in the tubes of the shell and tube heat exchanger and means for sending the liquid stream to be at least partially vaporized within the shell and tube heat exchanger, outside the tubes.

Preferably there are means for expanding two streams of liquid carbon dioxide from the bottom of the column and means for sending the two expanded streams to the shell and tube heat exchanger.

A further phase separator may separate partially condensed feed from the shell and tube exchanger and expansion means may be provided to expand the liquid stream formed as well as means for sending the expanded liquid to the top of the distillation column.

Purge means may be provided for removing liquid outside the tubes of the shell and tube heat exchanger.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figure 1:
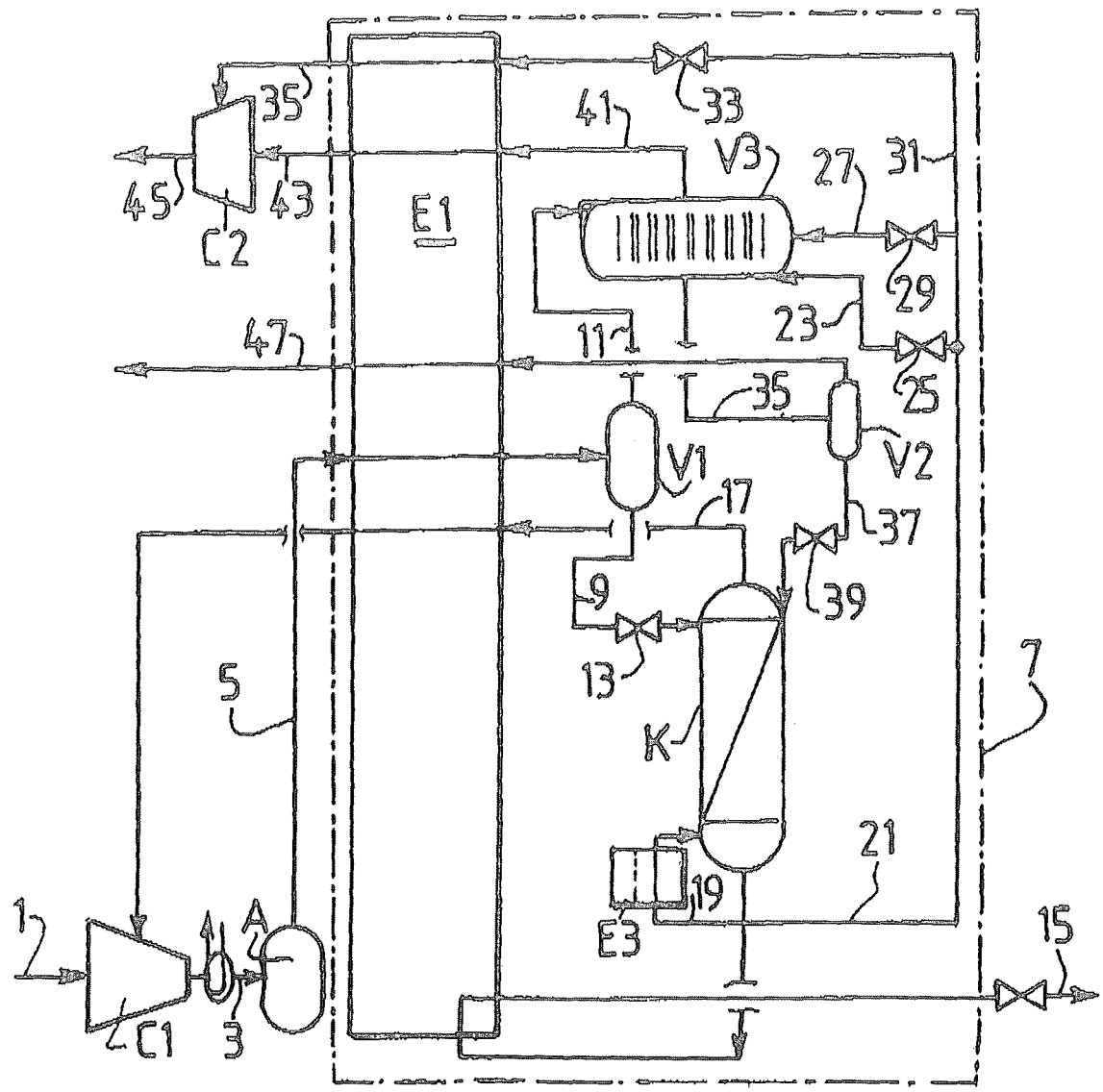
FIG. 1 provides an embodiment of the present invention.
Figure 2:
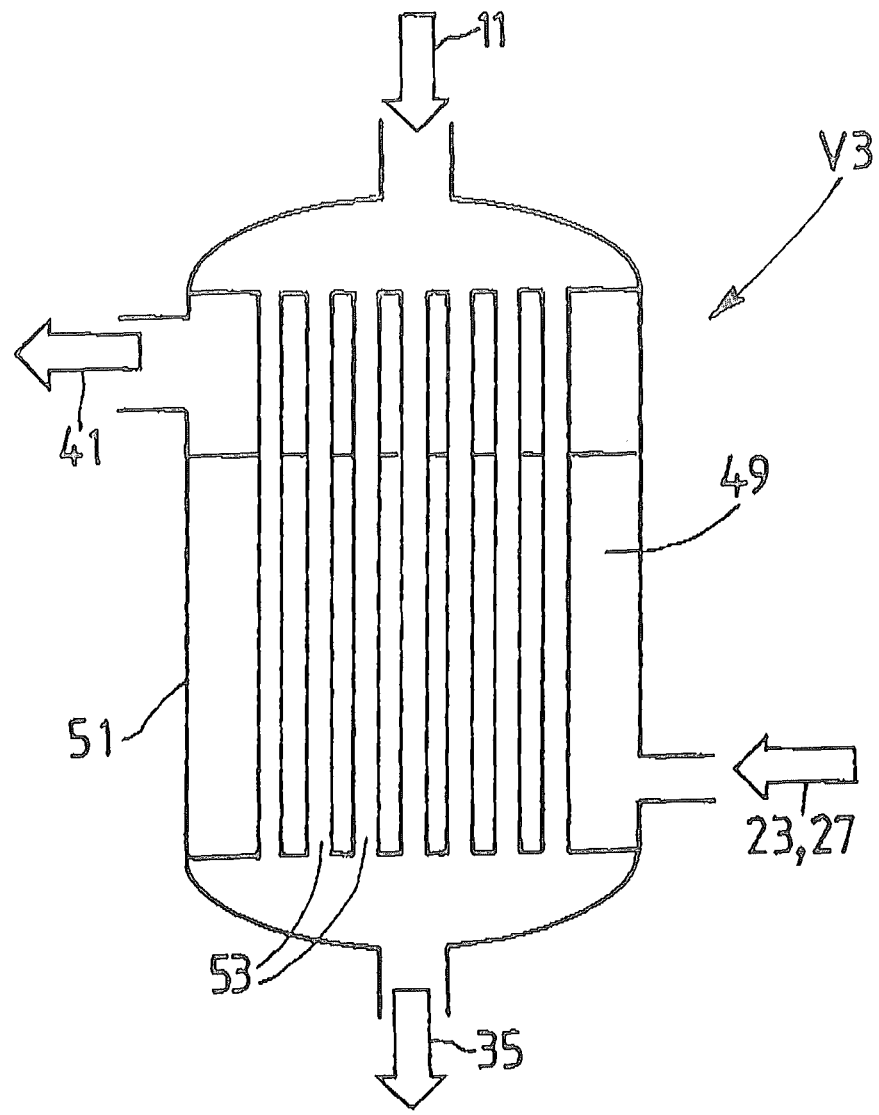
FIG. 2 provides an embodiment of the present invention.

The invention will be described in greater detail with reference to the figures, FIG. 1 illustrating a process for separating a gas rich in carbon dioxide according to the invention and FIG. 2 illustrating in greater detail a component of FIG. 1.

In FIG. 1 a gas 1 contains at least 65% carbon dioxide and at least one other component, chosen from at least one other components chosen from the following list: oxygen, nitrogen, argon, carbon monoxide, hydrogen, nitrogen monoxide, nitrogen dioxide, nitrous oxide, mercury. The gas may originate from an oxyfuel combustion, in which case it contains at least oxygen, nitrogen and argon.

The gas 1 is compressed in a compressor C1 to a pressure between 6 and 20 bars abs, cooled using a cooler 3 and then purified in one of a pair of adsorbers A to remove humidity. The purified feed stream 5 is then cooled in a heat exchanger E1 of the plate-fin type to a temperature of around −50° C. and thereby partially condensed. The partially condensed feed is sent to a first phase separator V1 in which it is separated into a gaseous portion 11 and a liquid portion 9. The gaseous portion 11, less rich in carbon dioxide than the feed 5, is sent to a heat exchanger V3 of the shell and tube type. The liquid portion 9 is expanded in a valve 13 and sent to the top of a column K. The bottom of the column K is heated using a heat exchanger E3 to boil the bottom liquid 19 and send the gas formed back to the column. Another liquid portion 21 removed from the column K is divided in three. Two portions 23, 27 are expanded in valves 25, 29 and sent to the heat exchanger V3. The remaining portion 33 is expanded in valve 33 and vaporized in heat exchanger E1 to form gaseous stream 35. The streams 23, 27 vaporise in heat exchanger V3 to form gaseous stream 41 which is warmed in heat exchanger E1 to form warmed stream 43 which is compressed in compressor C2. The gas 35 is sent to an intermediate stage of compressor 35 and the total gaseous stream 45 is removed as a gaseous product. A liquid product 15 is also removed as a liquid from the bottom of column K, warmed in exchanger E1, expanded and removed as a liquid product.

The gas 11 from the first phase separator V1 is condensed in the heat exchanger V3 to form liquid 35 and the liquid is sent to second phase separator V2. The liquid 37 formed in the second phase separator is expanded in valve 39 and sent to the top of column K. The gas 47 from the second phase separator V2 is warmed in the heat exchanger E1. The gas 17 from the top of the column is warmed in heat exchanger E1 and sent to compressor C1.

The heat exchanger E1, E3, phase separators V1, V2, heat exchanger V3 and column K are contained within in a cold box 7.

Further details of the shell and tube heat exchanger V3 are shown in FIG. 2, which shows a more realistic disposition of arrivals of gas and liquid. The gas 11 from the first phase separator 11 enters the top of the heat exchanger and flow down through the tubes 53 to form liquid 35. The two bottom liquids 23, 27 enter at the bottom of the heat exchanger V3 within the shell 51 and form a bath 49 of liquid carbon dioxide. Above the surface of the liquid, vaporized gas 41, less rich in carbon dioxide than the feed 5, is removed and sent to the heat exchanger E1.

The shell and tube heat exchanger 49 operates at the triple point pressure of carbon dioxide and the triple point temperature of carbon dioxide.

The process is designed for operation with a given carbon dioxide production. In this design case, solid carbon dioxide is formed in the shell and tube heat exchanger 49 at the point where the liquid streams 23, 27 enter the shell 51. In the case of increased production of carbon dioxide, the flowrate of the gaseous portion 11 sent to the shell and tube heat exchanger increases and the solid carbon dioxide in the shell and tube heat exchanger melts and the flowrate of the liquid fraction 35 removed from the shell and tube heat exchanger increases.

In the case of reduced production of carbon dioxide, the amount of solid carbon dioxide formed in the shell and tube heat exchanger 49 increases.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A process for the separation of a feed gas rich in carbon dioxide and containing at least one component lighter than carbon dioxide, the process comprising the steps of:
    cooling the feed gas rich in carbon dioxide to a subambient temperature in a first heat exchanger, wherein the feed gas is partially condensed and separated to form a gaseous portion and a liquid portion;
    sending the liquid portion to the top of a distillation column;
    removing a liquid stream from the bottom of the distillation column, wherein the liquid stream is richer in carbon dioxide than the feed gas;
    removing a gaseous stream from the top of the distillation column and warming the gaseous stream in the first heat exchanger, wherein the gaseous stream is less rich in carbon dioxide than the feed gas,
    sending the gaseous portion to second heat exchanger under conditions effective to form a partially condensed stream comprising a liquid fraction and a gaseous fraction, wherein the second heat exchanger is a shell and tube heat exchanger, the tubes of which are surrounded by a bath of liquid carbon dioxide at its triple point;
    sending the liquid fraction or a liquid derived therefrom to the top of the distillation column;
    vaporizing a first portion of the liquid stream from the bottom of the distillation column outside or within the distillation column to form a gas which is subsequently separated in the distillation column;
    vaporizing a second portion of the liquid stream from the bottom of the distillation column in the second heat exchanger to form a vapor and warming the resulting vapor in the first heat exchanger, wherein the second portion of the liquid stream from the bottom of the distillation column is expanded before vaporization,
    vaporizing a third portion of the liquid stream from the bottom of the distillation column in the first heat exchanger,
    wherein the liquid portion of the feed gas is sent to the top of the distillation column following an expansion step,
    wherein the shell and tube heat exchanger operates at the triple point pressure of carbon dioxide and the triple point temperature of carbon dioxide.

2. The process according to claim 1, wherein the vapor formed in the shell and tube heat exchanger and warmed in the first heat exchanger is compressed in at least one compressor.

3. The process according to claim 1, wherein the bath of carbon dioxide within the second heat exchanger comprises the second portion of the liquid stream removed from the bottom of the distillation column, wherein the gaseous portion is at least partially condensed in the tubes of the shell and tube heat exchanger and the second portion of the liquid stream is at least partially vaporized within the shell and tube heat exchanger, outside the tubes.

4. The process according to claim 3, wherein part of the liquid outside the tubes is purged in order to de-concentrate the liquid in at least one impurity.

5. The process according to claim 1, wherein in the case of operation with a given carbon dioxide production, solid carbon dioxide is formed in the shell and tube heat exchanger, in the case of increased production of carbon dioxide, the flowrate of the gaseous portion sent to the shell and tube heat exchanger increases and the solid carbon dioxide in the shell and tube heat exchanger melts and the flowrate of the liquid fraction removed from the shell and tube heat exchanger increases.

6. The process according to claim 1, wherein in the case of operation with a given carbon dioxide production, solid carbon dioxide is formed in the shell and tube heat exchanger and in the case of reduced production of carbon dioxide, the amount of solid carbon dioxide formed in the shell and tube heat exchanger increases.

7. The process according to claim 1, wherein a fourth portion of the liquid stream from the bottom of the distillation column is withdrawn as a final product.

8. The process according to claim 1, wherein the first heat exchanger is a plate-fin heat exchanger.

9. The process according to claim 1, wherein the liquid fraction or the liquid derived therefrom is expanded and sent to the top of the distillation column.

10. The process according to claim 1, wherein part of the liquid carbon dioxide outside the tubes is purged in order to de-concentrate the liquid carbon dioxide in at least one impurity.

11. The process according to claim 10, wherein the at least one impurity is selected from the group consisting of SOx, NOx, mercury, hydrocarbons, methanol, ethanol, ammonia, and combinations thereof.

* * * * *